No. 784,811. PATENTED MAR. 14, 1905.
W. SINCLAIR.
CARBID FEEDING DEVICE.
APPLICATION FILED JUNE 20, 1904.
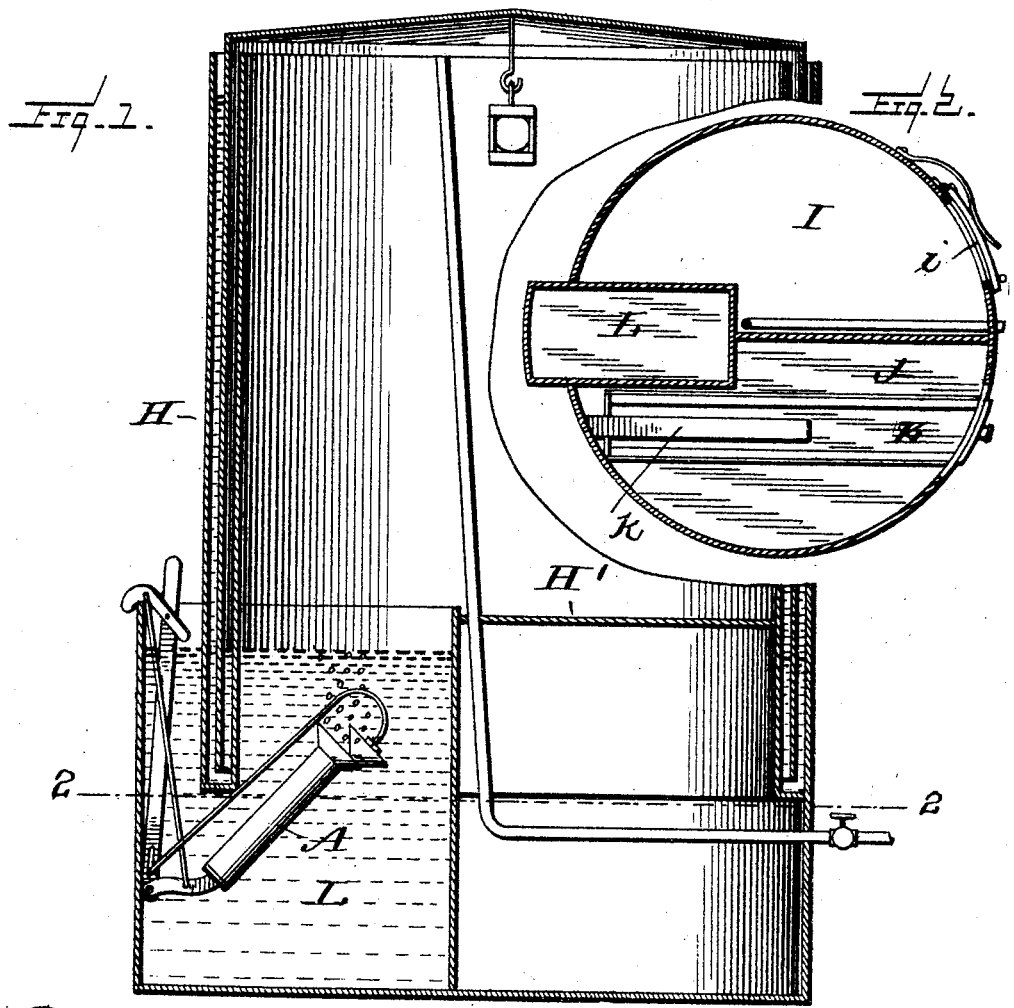
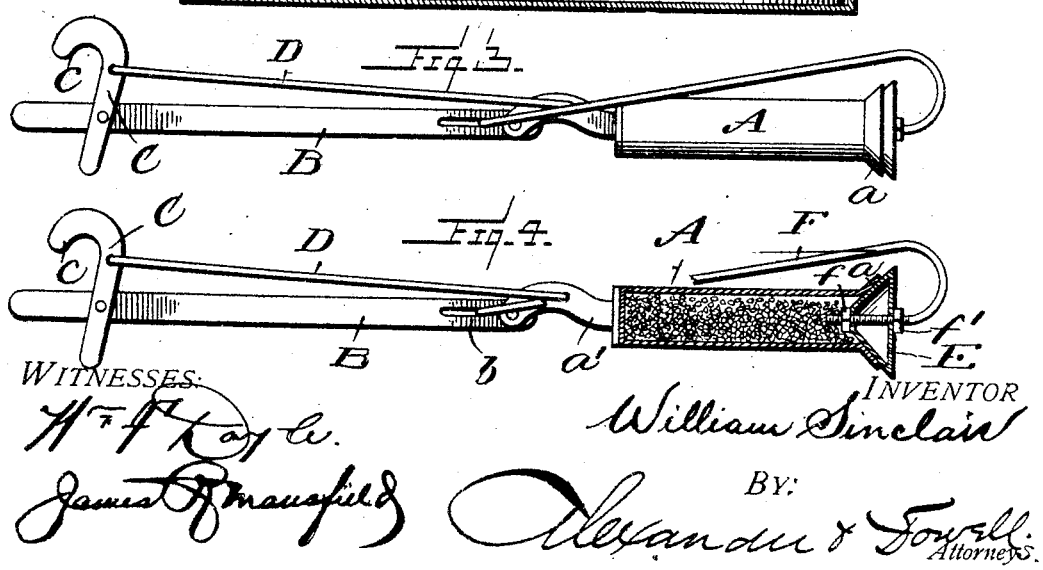
WITNESSES: INVENTOR
William Sinclair
BY:
Alexander & Towell
Attorneys.

No. 784,811. Patented March 14, 1905.

UNITED STATES PATENT OFFICE.

WILLIAM SINCLAIR, OF SAN ANTONIO, TEXAS.

CARBID-FEEDING DEVICE.

SPECIFICATION forming part of Letters Patent No. 784,811, dated March 14, 1905.

Application filed June 20, 1904. Serial No. 213,300.

*To all whom it may concern:*

Be it known that I, WILLIAM SINCLAIR, of San Antonio, in the county of Bexar and State of Texas, have invented certain new and useful Improvements in Carbid-Feeding Devices; and I hereby declare that the following is a full, clear, and exact description thereof, reference being had to the accompanying drawings, which form part of this specification.

This invention is an improvement in acetylene-gas-generating apparatus; and its object is to provide a simple device whereby the calcium carbid can be supplied to the generating-chamber without danger of gas escaping from the holder or loss or waste of material and in such manner that after the carbid is exhausted the waste can be withdrawn without fouling the apparatus.

The device is of such nature that a predetermined charge of carbid can be readily inserted in the generating-chamber at will without the manipulation of any valves or closures in the apparatus and without disturbing the gasometer-bell.

The invention consists in a novel carbid holder and support whereby the holder can be introduced mouth downward into the generating-chamber through a water-sealed opening and then the holder raised inside the water seal and opened, permitting water to enter the holder and the gas to escape into the gasometer-bell.

The invention will be described in detail, with reference to the accompanying drawings, and the features for which protection is desired are summarized in the claims.

In the drawings, Figure 1 is a vertical sectional elevation of a complete acetylene-gas-generating apparatus, showing the carbid-holder in operative position. Fig. 2 is a reduced transverse section on line 2 2, Fig. 1. Figs. 3 and 4 are side and sectional elevations of the carbid-holder.

A designates the carbid-holder, which is preferably tubular in form and has a flaring open mouth $a$ at one end and is closed at its other end and provided with a shank $a'$, by which the holder is pivoted on the end of a handle B. On the other end of the handle B is pivoted a lever C, provided with a hooked end $c$ and connected to the shank $a'$ by a rod D. When lever C is in the position indicated in Figs. 3 and 4, (approximately at right angles to handle B,) the holder A is approximately in line with the handle; but when lever C is turned to the position shown in Fig. 1 (approximately parallel with handle B) the holder A is swung upward, so that its mouth is elevated above the pivot of shank $a'$ to handle B.

The mouth $a$ of the holder may be closed by a valve E, which is preferably attached to one end of a rod F, that is bent back toward the handle B and has its other end slidably confined in a slot $b$ in the handle. The parts are so proportioned that when in the position shown in Figs. 3 and 4 the valve E closes the mouth of the holder, but when in the position shown in Fig. 1 the valve is unseated. The valve E may be confined between nuts $f\ f'$ on the rod, which permit of the valve being adjusted to properly close or open the holder when in the various positions indicated in the drawings.

In order to more readily explain the operation of the holder, I have shown in Figs. 1 and 2 the preferred form of apparatus or gasometer I employ therewith. G is the gas-bell, which may be suitably weighted and is preferably water-sealed between the double walls of the tank H, which has a false bottom H', below which may be arranged a chamber I for fresh carbid, said chamber being provided with a door $i$, which should be constructed to close sufficiently tight to prevent moisture contacting the carbid. Another chamber, J, may be used for the spent carbid refuse, and another chamber, K, may be provided to contain the holder when not in use. This chamber K may have a rod $k$ in it to facilitate cleaning out the holders. At one side of the gasometer and below the bell is a generating-chamber L, which extends outside of and below the double walls of the gas-holder H, the water in the chamber forming an effective seal to prevent escape of gas from the holder through the generating-chamber. This generating-chamber may be open at top both outside and inside the gasometer, as shown.

The mode of using the carbid-holder and apparatus is as follows: A quantity of fresh carbid is placed in the holder A, and then the parts are turned into position indicated in Figs. 3 and 4, so that the holder is closed by the valve E. Then the holder is inserted mouth downward into the outer leg of the generating-chamber, and when it reaches the bottom thereof lever C is pulled so as to turn the holder upward into the position shown in Fig. 1, so that it projects up into the inner leg of the generating-chamber. This movement of the holder causes the unseating of valve E and permits water to enter the holder and contact the carbid, and the resultant gas escapes upwardly into the gasometer, while the spent and waste carbid remains in the holder. The holder can be suspended by catching the hooked end $c$ of the lever C over the edge of the outer wall of the generating-chamber, as shown in Fig. 1, until the carbid is spent. When it is desired to remove the holder, the handle is lifted and lever C thrown back until the holder is brought into alinement with the handle, which movement produces the automatic closing of valve E, so that the spent carbid is retained in the holder while being removed from the generating-chamber and can be emptied where desired.

The simplicity of the carbid-charging device is obvious. No manipulation of valves is required, the holder can be removed and replaced in the generating-chamber readily, and no skilled workman or special knowledge of the apparatus is required to operate it.

I do not consider the valve E indispensable; but it is advantageous to use it both to prevent water contacting the carbid until the holder is fully entered within the inner leg of the generating-chamber and to retain the spent carbid when the holder is removed.

The slot $b$ in the handle permits the valve E being entirely withdrawn from the end of holder when placing carbid therein or when it is desired to cleanse the holder or let it dry out.

Having thus described my invention, what I therefore claim as new, and desire to secure by Letters Patent thereon, is—

1. A charging device for acetylene-gas-generating apparatus, comprising a handle, a carbid-holder pivoted to one end of the handle, a lever pivoted to the other end of the handle, and connections between said lever and holder, whereby the holder can be held in alinement or at an angle to the handle, substantially as described.

2. In a charging device for acetylene-gas-generating apparatus, the combination of a handle, a holder pivoted to one end of the handle, and means for retaining the holder in line with or at an angle to the handle; with a valve for closing said holder, and means for opening the valve when the holder is shifted to an angle with the handle, substantially as described.

3. A charging device for acetylene-gas-generating apparatus, comprising a handle, a carbid-holder pivoted to one end of the handle, a lever pivoted to the other end of the handle, and connections between said lever and holder, whereby the holder can be held in alinement or at an angle to the handle; with a valve for closing the open end of the holder when in line with the handle, and means whereby the valve is opened when the holder is turned to an angle with the handle, substantially as described.

4. A charging device for acetylene-gas-generating apparatus, comprising a handle, a carbid-holder pivoted to one end of the handle, a lever pivoted to the other end of the handle, and connections between said lever and holder, whereby the holder can be held in alinement or at an angle to the handle; with a valve for closing the open end of the holder when in line with the handle, and a rod connecting the valve and handle—whereby the valve is opened when the holder is turned to an angle with the handle, substantially as described.

5. In combination, a gasometer, a water-holding chamber below the bell, extending both in and out of the gasometer; with a carbid-charging device comprising a handle, a holder pivoted to one end thereof, a lever pivoted to the other end thereof, and a connection between the lever and holder, whereby the holder can be tilted upwardly in the inner leg of the generating-chamber after it has been inserted downwardly through the outer leg thereof, substantially as described.

6. In combination, a gasometer, and a water-holding generating-chamber below the bell, extending both in and out of the gasometer; with a carbid-charging device consisting of a handle, a holder pivoted to one end thereof, a valve for closing the outer end of the holder, means for unseating the valve when the holder is tilted upwardly, and means for tilting the holder upwardly in the inner leg of the generating-chamber after it has been inserted downwardly through the outer leg thereof, substantially as described.

7. In combination, a gasometer, a water-holding generating-chamber below the bell extending both in and out of the gasometer; with a carbid-charging device comprising a handle, a holder pivoted to one end thereof, a valve for closing the outer end of the holder, means for unseating the valve when the holder is tilted upwardly, a lever pivoted to the other end of the handle, and a connection between the lever and holder, whereby the holder can be tilted upwardly in the inner leg of the generating-chamber after it has been inserted downwardly through the outer leg thereof, substantially as described.

8. A charging device for acetylene-gas-generating apparatus, comprising a handle, a carbid-holder pivoted to one end thereof, and means whereby the holder can be held mouth downward in alinement with the handle, and whereby it can be swung upwardly at an angle thereto, with a valve or cover for the holder adapted to close the same when it is mouth downward and to admit water into the holder when it is swung upwardly, substantially as described.

9. In combination, a gasometer, and a water-holding chamber below the bell, opening both in and out of the gasometer; with a carbid-charging device consisting of a handle, a holder pivoted to one end thereof, adapted to be inserted mouth downward into the outer part of said water-chamber, and means for swinging the holder upwardly into the gasometer-leg of the water-chamber after it has been inserted downwardly through the outer leg thereof, substantially as described.

In testimony that I claim the foregoing as my own I affix my signature in presence of two witnesses.

WM. SINCLAIR.

In presence of—
 A. W. HARTUNG,
 JAS. ANDERSON.